J. McDANIEL.
GRAIN CLEANING MACHINE.
APPLICATION FILED MAY 14, 1912.

1,069,453.

Patented Aug. 5, 1913.

3 SHEETS—SHEET 2.

WITNESSES

INVENTOR
JAMES McDANIEL
BY Paul & Paul
ATTORNEYS

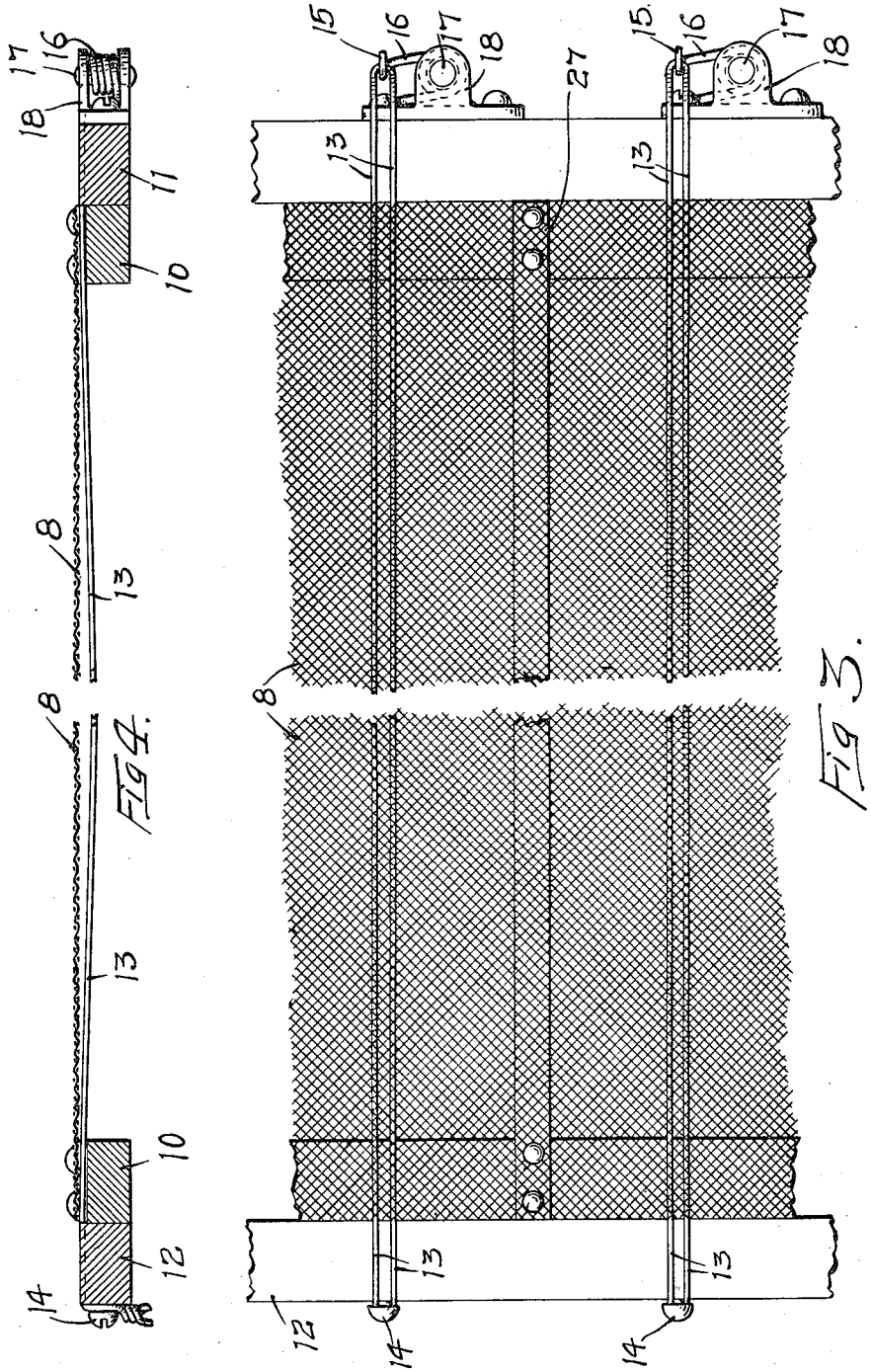

UNITED STATES PATENT OFFICE.

JAMES McDANIEL, OF MINNEAPOLIS, MINNESOTA.

GRAIN-CLEANING MACHINE.

1,069,453.　　　　　Specification of Letters Patent.　　Patented Aug. 5, 1913.

Application filed May 14, 1912. Serial No. 697,167.

*To all whom it may concern:*

Be it known that I, JAMES McDANIEL, of Minneapolis, Hennepin county, Minnesota, have invented certain new and useful Improvements in Grain-Cleaning Machines, of which the following is a specification.

My invention relates to machines for separating wheat from oats and other grain and removing weed seeds and other refuse, and the object of the invention is to provide means for keeping the meshes of the screens clear and preventing oat kernels and other material from clogging therein to the end that the capacity of the machine will be maintained and no attention will be required on the part of the operator to remove the oat kernels or refuse material from the meshes of the screens.

The invention consists generally in various constructions and combinations, all as hereinafter described and particularly pointed out in the claims.

Figure 1:
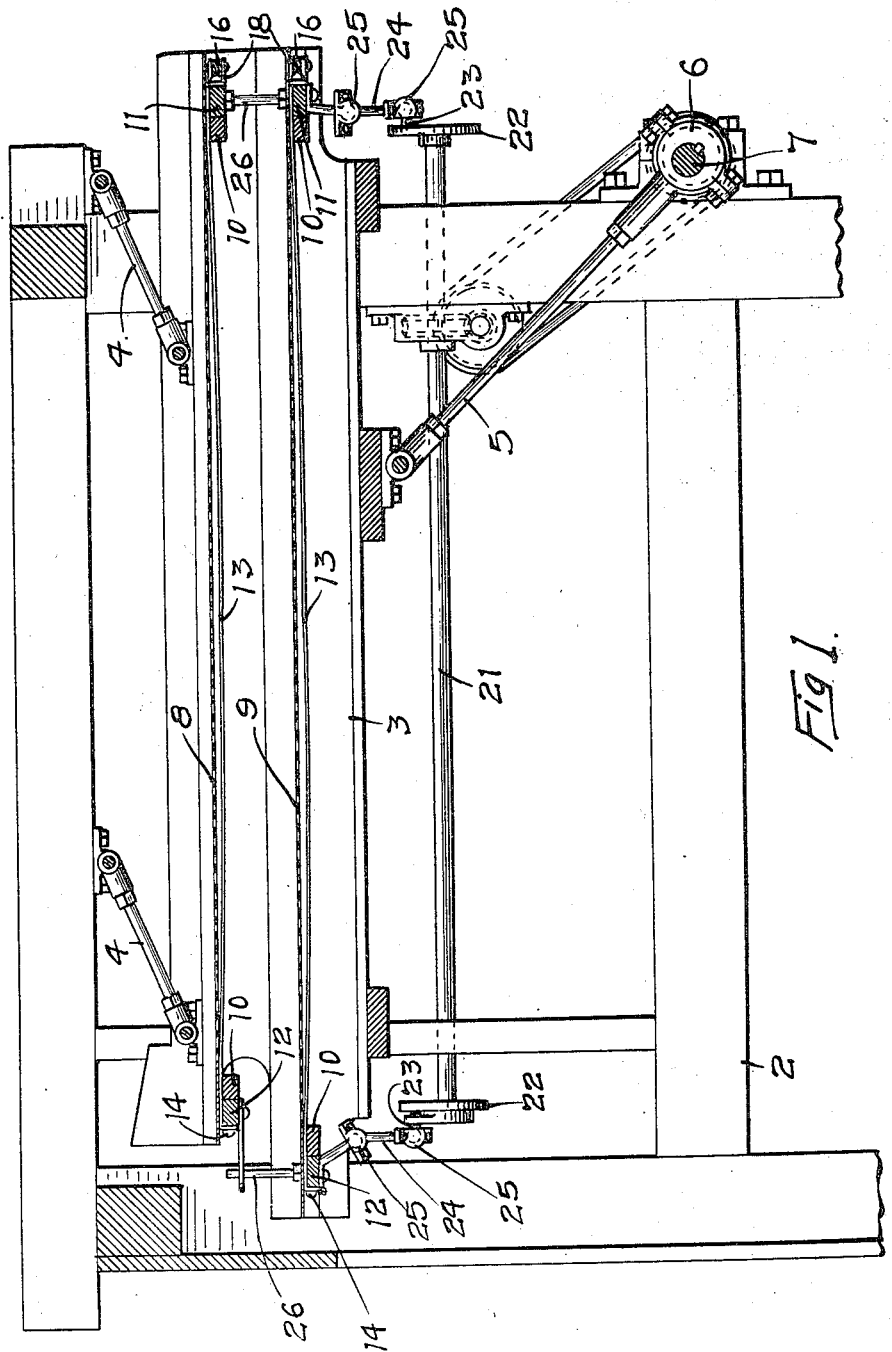
Figure 2:
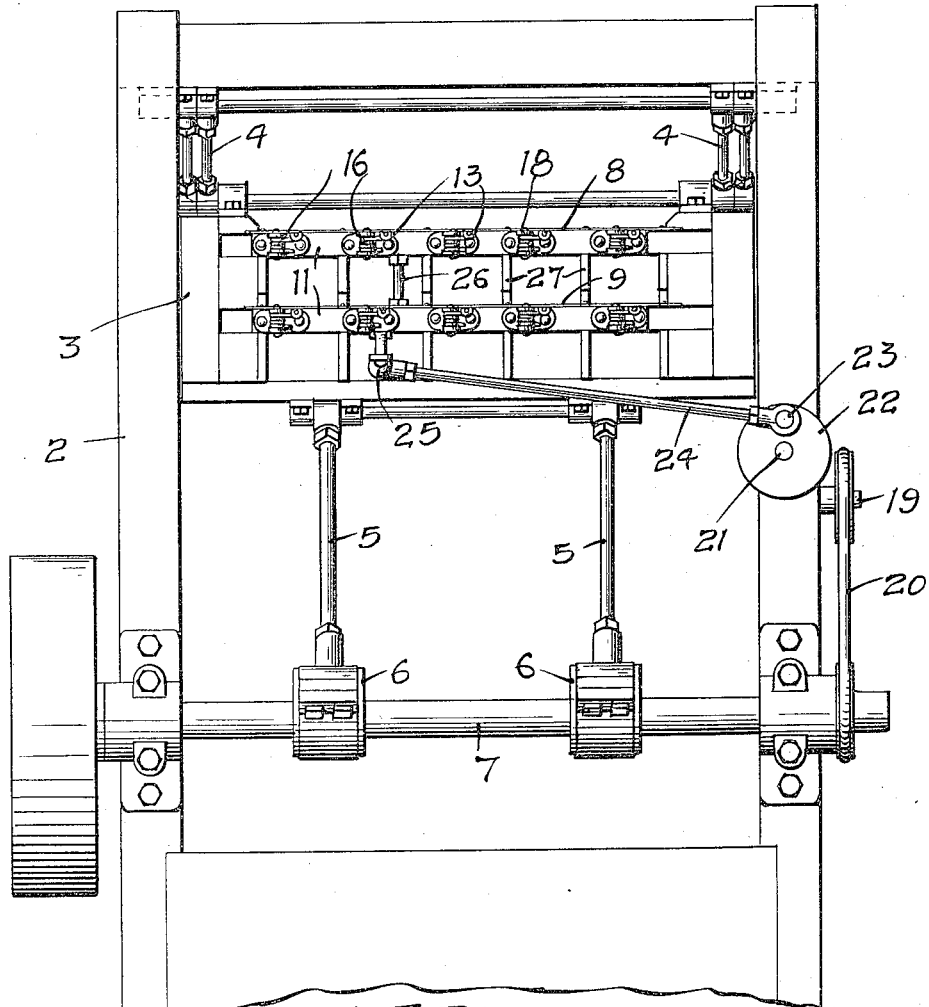
Figure 5:
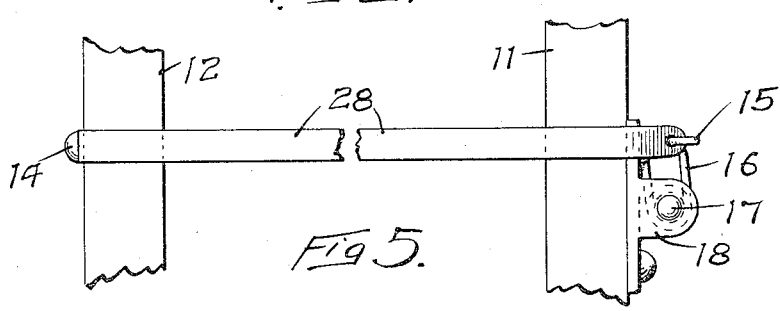

In the accompanying drawings forming part of this specification, Figure 1 is a longitudinal sectional view of a grain cleaning machine embodying my invention, Fig. 2 is a transverse view of the same, Fig. 3 is a plan view of a portion of one of the screens, showing the means for clearing the meshes, Fig. 4 is a sectional view of the same, Fig. 5 is a detail view showing a modified form of the screen clearing means.

In the drawing, 2 represents the frame of the machine.

3 is a shoe suspended by links 4 in the usual way from the frame of the machine and agitated through the rod 5 connecting the shoe with the eccentric 6 on the shaft 7. In this shoe screens 8 and 9 are mounted. These screens are of ordinary construction and while I have shown two of them, I do not confine myself to this number, for as many may be employed as required for the successful operation of the machine. Each screen has end bars 10 extending transversely of the shoe, and parallel with these bars 10 are somewhat similar bars 11 and 12 adapted to slide back and forth transversely of the shoe, guided preferably by the bars 10.

For the purpose of keeping the meshes of the screen clear I provide whipping devices, shown in Figs. 3 and 4 as consisting of wires 13 attached to pins 14 in the bars 12 and looped around hooks 15 formed on the ends of springs 16 which are coiled around pins 17 mounted in brackets 18 which are secured to the bars 11 at the other end of the machine. As indicated in Fig. 4, the wires pass beneath the screen fabric between it and the bars 10, sufficient space being provided for this purpose, and in the motion of the screen a whipping action is exerted on the bottom of the fabric by the wires. The wires will naturally sag in the middle, away from the fabric, as indicated in Fig. 1, but the gyrating motion of the shoe will cause them to whip the under surface of the screens. During this whipping action the bars 11 and 12 are moved lengthwise transversely of the shoe and to accomplish this movement I prefer to employ the following described mechanisms.

Referring to Fig. 2, a stub shaft 19 is driven from the shaft 7 through a belt 20. The shaft 19 is geared to a horizontal shaft 21, as shown in Fig. 1. At each end of the shaft 21 is a disk 22 provided with a crank pin 23. Rods 24 are connected to these pins at one end and at the other end to the lower bars 11 and 12. The rods are provided with universal joints 25. The bars 11 and 12 of the two screens have a rigid connection 26 between them so that these bars will move in unison transversely of the sieve.

In the operation of the machine, the shoe will be agitated through the rods 5 and the revolution of the shaft 21 will cause the bars 11 and 12 to be reciprocated, sliding the whipper wires back and forth beneath the meshes of the screen, while the agitation of the screens and the tension of the springs connected to the wires will cause them to whip the underside of the fabric, dislodge the oat kernels from the meshes of the fabric, and prevent any foreign material from clogging the screens. The transverse movement of the whipper wires, in addition to their whipping action on the under surface of the screen, greatly increases their efficiency and enables me to keep the screen clear, throughout its entire width, of oat kernels and foreign material which may lodge in the meshes thereof.

I prefer to provide the screens with longitudinal bars 27, as shown in Fig. 3, arranged at suitable intervals, and the whipper wires have a transverse movement between these bars. In place of the whippers composed of wires, I may employ flat bands 28, as indicated in Fig. 5. These bands, instead of being looped around the hooks of the springs and the pins 14, will have eyes formed therein to receive the pins and hooks. Their operation, however, will be substantially the same as heretofore described with reference to the whipper wires. Any suitable number of these whippers may be employed and evidently any number of screens may be equipped with them, according to the size and capacity of the machine.

I claim as my invention:—

1. The combination, with a screen and means for agitating the same, of means for whipping the screen to clear the meshes thereof, and means for moving said whipping means transversely with respect to the screen during the whipping operation, said whipping means being connected at both ends to said moving means.

2. The combination, with a shoe and a screen mounted therein, of means actuated by the motion of the screen for whipping the surface of said screen, said whipping means also having a movement in a plane parallel substantially with the plane of said screen.

3. The combination, with a shoe and a screen mounted therein, of wires mounted beneath said screen, and actuated by the movement of the screen to whip the under surface thereof, and means for moving said wires in a plane parallel substantially to the plane of said screen during the whipping operation.

4. The combination, with a shoe and a screen mounted therein, of whipping means arranged to whip the surface of the screen, means yieldingly holding one end of said whipping means and means for moving said whipping means transversely of the screen.

5. The combination, with a shoe, of screens mounted therein, one above another, bars movable transversely with respect to said screen and means carried by said bars and arranged to whip the surfaces of the screens.

6. The combination, with a shoe, of screens mounted therein, one above another, bars arranged to move lengthwise, transversely of said screens, means rigidly securing the corresponding bars together and a screen whipping means carried by said bars.

7. The combination, with a shoe, of a screen mounted therein, bars slidable transversely of said screen, whipping means mounted on said bars and adapted to engage the surface of the screen and means for putting said whipping means under longitudinal tension during the whipping operation.

8. The combination, with a shoe and a screen mounted therein, said screen having bars at its ends, of whipping means passing over said bars and under the screen fabric and adapted to whip the under surface of the screen, and means at the ends of said screen and having a movement transversely thereof whereto said whipping means are attached.

9. The combination, with a shoe and a screen mounted therein, of whippers arranged lengthwise of the screen on the underside thereof, bars arranged to slide transversely of the screen, one of said bars having means for connecting one end of the whippers thereto, springs provided on the other bar and adapted to exert a longitudinal pull on said whippers, and means for reciprocating said bars.

10. The combination, with a shoe and a screen mounted therein, of whipping means arranged to whip the surface of the screen, means securing said whipping means at one end, and means yieldingly holding the other end of said whipping means.

11. The combination, with a shoe, of a screen mounted therein, a whipping means arranged to operate on said screen to clear the meshes thereof, and means for putting said whipping means under longitudinal tension during the whipping operation.

12. The combination, with a shoe and a screen mounted therein, of means for whipping the surface of said screen, said whipping means having a movement at right angles substantially to the surface of said screen and also having a movement at both ends transversely of said screen during the whipping operation.

In witness whereof, I have hereunto set my hand this 8th day of May 1912.

JAMES McDANIEL.

Witnesses:
GENEVIEVE E. SORENSEN,
EDWARD A. PAUL.

---

Copies of this patent may be obtained for five cents each, by addressing the "Commissioner of Patents, Washington, D. C."